(12) United States Patent
Springer et al.

(10) Patent No.: US 8,416,993 B2
(45) Date of Patent: Apr. 9, 2013

(54) OBJECT BOUNDARY ACCURATE MOTION DETECTION USING HIERARCHICAL BLOCK SPLITTING AND MOTION SEGMENTATION

(75) Inventors: Paul Springer, Stuttgart (DE); Oliver Erdler, Ostfildern-Ruit (DE)

(73) Assignee: Sony Corporation, Tokyo (JP)

( * ) Notice: Subject to any disclaimer, the term of this patent is extended or adjusted under 35 U.S.C. 154(b) by 1185 days.

(21) Appl. No.: 12/267,986

(22) Filed: Nov. 10, 2008

(65) Prior Publication Data

US 2009/0136092 A1    May 28, 2009

(30) Foreign Application Priority Data

Nov. 14, 2007    (EP) .................................... 07120706

(51) Int. Cl.
*G06K 9/00*    (2006.01)
*G06K 9/48*    (2006.01)
(52) U.S. Cl.
USPC ........................................ 382/107; 382/199
(58) Field of Classification Search .................. None
See application file for complete search history.

(56) References Cited

U.S. PATENT DOCUMENTS

| | | | |
|---|---|---|---|
| 4,679,079 A | | 7/1987 | Catros et al. |
| 4,987,480 A | * | 1/1991 | Lippman et al. ........... 348/396.1 |
| 6,205,231 B1 | * | 3/2001 | Isadore-Barreca et al. ... 382/103 |
| 6,285,797 B1 | * | 9/2001 | Lubin et al. .................... 382/254 |
| 6,757,022 B2 | * | 6/2004 | Wredenhagen et al. ...... 348/452 |
| 7,098,958 B2 | * | 8/2006 | Wredenhagen et al. ...... 348/452 |
| 7,319,776 B2 | * | 1/2008 | Ide et al. ....................... 382/103 |
| 7,359,552 B2 | * | 4/2008 | Porikli ............................ 382/190 |
| 7,724,304 B2 | * | 5/2010 | Wredenhagen et al. ...... 348/452 |
| 7,764,827 B2 | * | 7/2010 | Op De Beeck et al. ........ 382/154 |
| 7,860,311 B2 | * | 12/2010 | Chen et al. .................... 382/173 |
| 7,865,015 B2 | * | 1/2011 | Chen et al. .................... 382/173 |

FOREIGN PATENT DOCUMENTS

| | | |
|---|---|---|
| EP | 1 383 309 A2 | 1/2004 |
| EP | 1 424 851 A2 | 6/2004 |
| EP | 1 549 048 A2 | 6/2005 |
| EP | 1 734 767 A1 | 12/2006 |

OTHER PUBLICATIONS

Juergen Stauder, et al., "Detection of Moving Cast Shadows for Object Segmentation", IEEE Transactions on Multimedia, vol. 1, No. 1, XP011036282, Mar. 1999, pp. 65-76.

Daniel J. Dailey, "An Algorithm to Estimate Mean Traffic Speed Using Uncalibrated Cameras", IEEE Transactions on Intelligent Transporation systems, vol. 1, No. 2, XP011028368, Jun. 2000, pp. 98-107.

(Continued)

*Primary Examiner* — Manav Seth
(74) *Attorney, Agent, or Firm* — Oblon, Spivak, McClelland, Maier & Neustadt, L.L.P.

(57) ABSTRACT

The present invention is directed to an apparatus for motion segmentation in the field of motion detection, whereby an initial motion map is processed to a more accurate final motion map which identifies the non- and the movement of pixels between at least two successive images, said apparatus comprising a processing-segmentation device and a combination-logic device. In this apparatus the initial motion map is processed to three different feature maps, describing static edges, moving edges and moving flat areas between at least two successive images, respectively. The present invention is further directed to a corresponding method adapted for motion segmentation in the field of motion detection.

28 Claims, 4 Drawing Sheets

OTHER PUBLICATIONS

Changick Kim, et al., "An Integrated Scheme for Object-based Video Abstraction", Proceedings ACM Multimedia, 2000, XP002477444, pp. 303-311.

Lejun Yu, et al., "Motion Adaptive Deinterlacing with Accurate Motion Dection and Anti-Aliasing Interpolation Filter", IEEE Transactions on Consumer Electronics, vol. 52, No. 2, XP002477445, May 2006, pp. 712-717.

Chaohui Zhan, et al., "An Improved Moving Object Detection Algorithm Based on Frame Difference and Edge Detection" Fourth International Conference on Image and Graphics, XP031131343, Aug. 2007, pp. 519-523.

Chao-Chee Ku, et al., "Accurate Motion Detection and Sawtooth Artifacts Remove Video Processing Engine for LCD TV", IEEE Transactions on Consumer Electronics, vol. 50, No. 4, Nov. 2004, pp. 1194-1201.

D. Van De Ville, et al., "Deinterlacing Using Fuzzy-Based Motion Detection", Third International Conference on Knowledge-Based Intelligent Information Engineeing Systems, Aug. to Sep. 1999, pp. 263-267.

Christian Hentschel, "High Quality Noise Insensitive Motion Detector Using One Field Memory", IEEE Transactions on Consumer Electronics, vol. 42, No. 3 Aug. 1996, pp. 696-704.

Renxiang Li, "Reliable Motion Detection/Compensation for Interlaced Sequences and Its Applications to Deinterlacing", IEEE Transactions on Circuits and Systems for Video Technology, vol. 10, No. 1, Feb. 2000, pp. 23-29.

Tero Koivunen, "Motion Detection of an Interlaced Video Signal", IEEE Transactions on Consumer Electronics, vol. 40, No. 3, Aug. 1994, pp. 753-760.

Shyh-Feng Lin, et al., "Motion Adaptive De-Interlacing by Horizontal Motion Detection and Enhanced ELA Processing", DSP/IC design Lab, Department of Electrical Engineering, IEEE, 2003, pp. II-696-II-699.

Shyh-Feng Lin, et al., "Motion Adaptive Interpolation with Horizontal Motion Detection for Deinterlacing", IEEE Transactions on Consumer Electronics, vol. 49, No. 4, Nov. 2003, pp. 1256-1265.

Yanfei Shen, et al., "Motion Adaptive Deinterlacing of Video Data with Texture Detection", IEEE Transactions on Consumer Electronics, vol. 52, No. 4, Nov. 2006, pp. 1403-1408.

\* cited by examiner

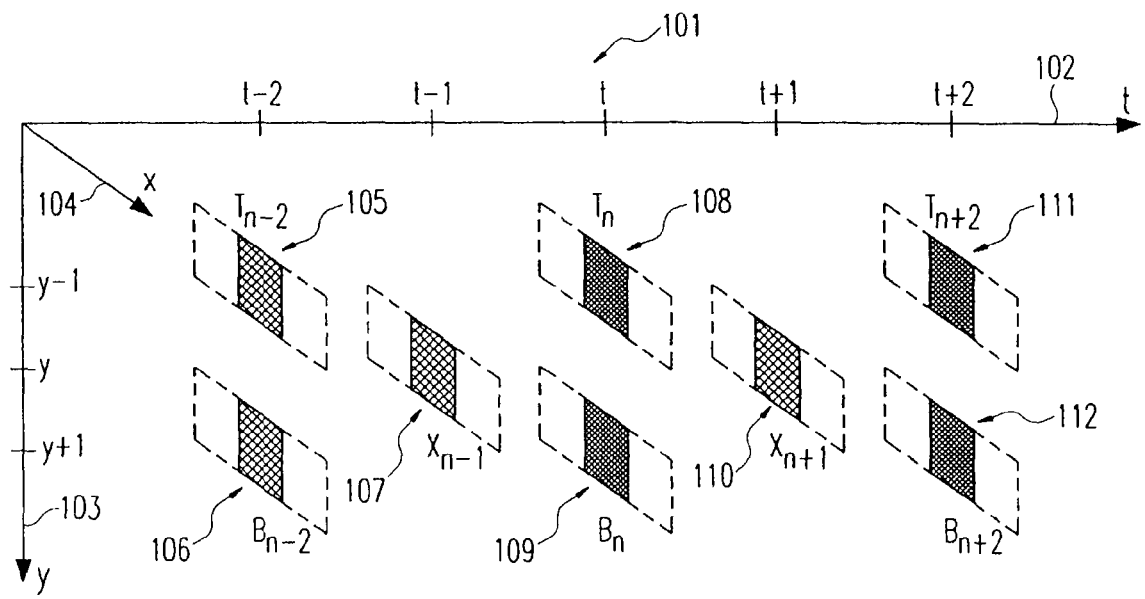
Fig. 1
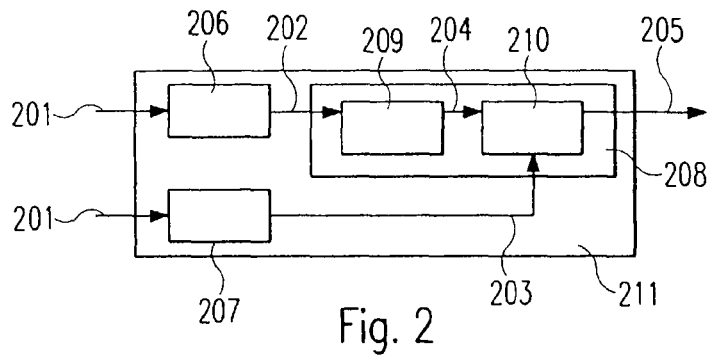
Fig. 2
| 0 | 0 | 1 | 0 | 0 |
|---|---|---|---|---|
| 0 | 1 | 1 | 1 | 0 |
| 1 | 1 | 1 | 1 | 1 |
| 0 | 1 | 1 | 1 | 0 |
| 0 | 0 | 1 | 0 | 0 |
Fig. 3
| 0 | 1 | 0 |
|---|---|---|
| 1 | 1 | 1 |
| 0 | 1 | 0 |
Fig. 4

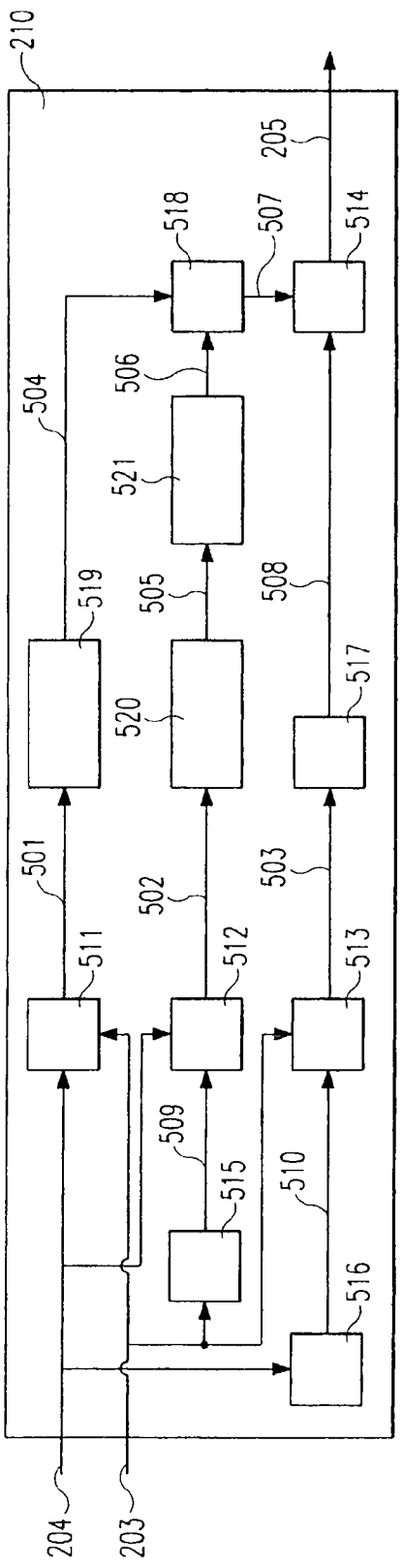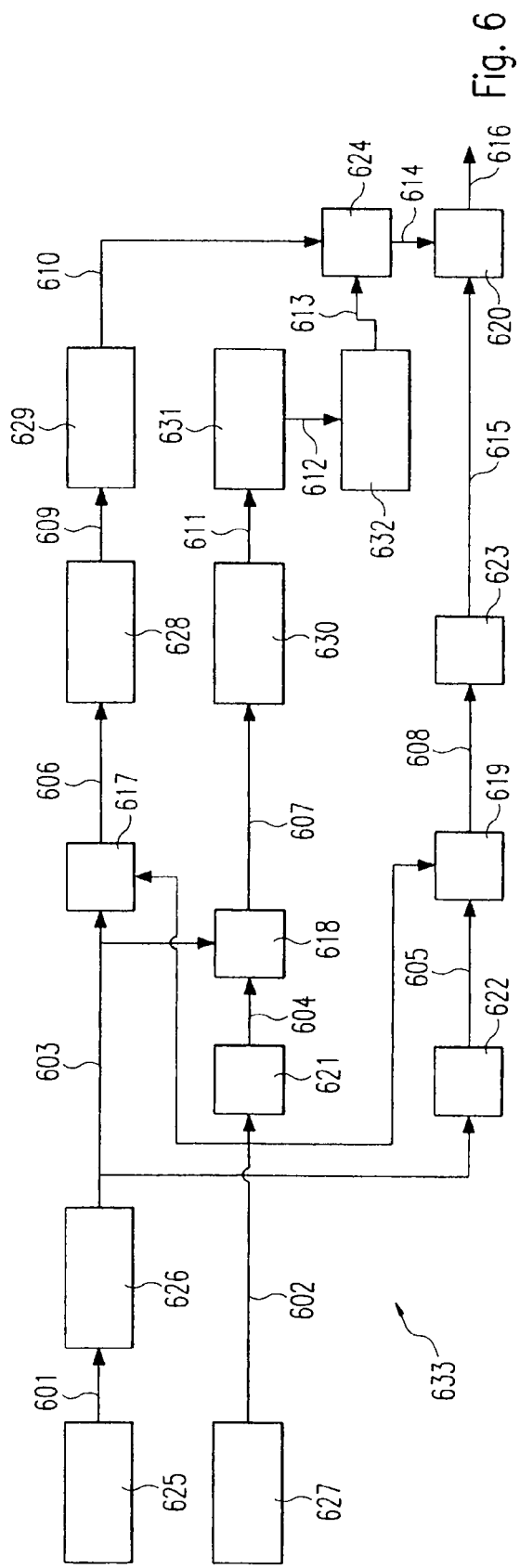

OBJECT BOUNDARY ACCURATE MOTION DETECTION USING HIERARCHICAL BLOCK SPLITTING AND MOTION SEGMENTATION

TECHNICAL FIELD OF THE INVENTION

The present invention describes a new method for motion detection, which results in a more accurate and homogeneous motion map comprising a smaller number of motion detection errors as current state of the art methods.

One of the image processing goals e.g. in the field of artificial vision is to emulate some features of the human visual system, such as the skill of recognizing object movements and tracking their behavior in a complex environment.

The first step in tracking applications is to detect moving objects in the environment, classifying object pixels and gathering them in connected areas characterized by features that allow their identification; this reduces the problem complexity giving a global perception of the scene. Doing this way, a connection between said areas and real moving objects in the environment is created and object behavior in the scene is replaced by said areas' behavior on the image plane.

In the field of motion detection, three sub-fields can be identified:

Environment Modeling, Motion Segmentation and Object Classification.

In motion segmentation the problem is to find independently moving objects in a video or sequence of images and thus to cluster the scene, or features extracted from it, into regions having a common motion. In most cases, segmentation relies on the image gray value or color, sometimes extended by texture representations. In case of image sequences, however, also motion information has been a popular clue for segmentation over the past decades.

Most motion segmentation techniques thereby handle the optic flow, or just the image difference, as a precomputed feature that is fed into a standard segmentation method. In general some significant requirements to a motion detector can be stated. Following items can hold as requirements for a motion detection process in image processing applications:

Correctness: In a most basic statement, the detection process should minimize false positives and false negatives in an ideal environment.

Robustness: It should be robust to a certain extend to noise influence.

Homogeneity: This shall assure the correct description of object movement. Typically the human visual system is sensitive to spurious, local errors. Therefore it is preferable to achieve homogeneous maps for a consistent processing within semantic objects in a picture scene.

Accuracy: It is important that the shape of an object is described accurately to avoid influences between semantic objects in the picture.

By fulfilling those criteria it is possible to describe the stationary or moving state of objects in a video sequence in an adequate way for image processing applications. Another requirement, usually for consumer electronic applications, is the complexity of the motion detection algorithm.

STATE OF THE ART

As far as motion segmentation is concerned, two main approaches have been proposed in scientific literature: image difference and background subtraction. The former consists of a thresholded difference between frame at time t and frame at time t−1; this method is very performant in computational terms and grants a prompt object motion detection between two frames; however, it suffers two well known drawbacks caused by frame rate and object speed: foreground aperture and ghosting.

In the motion segmentation, there are problems, which are presented as 'Ghosts' and 'Shadows'. It is about display portions, which are recognized in the frame comparison as moving parts. These display portions, however, do not correspond to a real object and thus should not be considered during object classification.

'Ghosts' occur, when objects are recorded to the background reference model and are moved or erased from the background. The expression 'Shadow' describe the shadow, whereby shadows of a searched object and shadows of a 'Ghost' are differentiated from each other.

In a current de-interlacing framework state of the art motion detection algorithms try to detect motion between consecutive input fields. Therefore differences of pixel taken from a number of succeeding fields are compared with a threshold. If the pixel difference is lower than a given threshold no motion is embraced. If on the other hand the pixel difference between respective fields is greater than a certain threshold motion is assumed. There are various different configurations on the pixel selection and thresholding process described in the literature.

After all and in view of the state of the art, mainly two kinds of detection errors are observed which can lead in an exemplary de-interlacing application to picture artifacts:

False positives: moving areas are wrongly detected as static regions, which results in a 'mouse-teeth' artifact.

False negatives: static regions are detected as moving, which in presence of high vertical detail leads to 'flicker artefact'.

SUMMARY

An objective of the present invention is to enhance the object border handling in terms of motion detection errors, while maintaining object shape.

Another objective is to improve the correctness of motion information within stationary or moving objects.

Another objective is to improve the homogeneity of the motion map by eliminating pixel errors.

These objectives are solved by an accurate motion map generating apparatus operable to receive and process input data comprising a motion map and to output a final motion map, whereby said motion map identifies the non- and the movement of pixels between at least two successive images, said apparatus comprising a processing-segmentation device operable to receive and process said input data and output a first signal M1, a second signal M2 and a third signal M3, whereby said signals M1, M2 and M3 are feature maps, respectively, which base on said input data and describe characteristics between the at least two successive images, said first signal M1 describing static edges, said second signal M2 describing moving edges, and said third signal M3 describing moving flat areas; and a combination-logic device operable to receive and process said first signal M1, said second signal M2 and said third signal M3 and to output said final motion map, whereby said final motion map is based on said signals M1, M2 and M3.

Favourably, the combination-logic device is operable to process signal M2 to signal A based on a morphological closing operation Closing A.

Favourably, the operation Closing A comprises a morphological dilatation operation followed by a morphological erosion operation.

Favourably, the combination-logic device is operable to process signal M3 to signal B based on a morphological closing operation Closing B followed by a post-processing operation.

Favourably, the operation Closing B comprises a morphological dilatation operation followed by a morphological erosion operation.

Favourably, said post-processing operation comprises a two-dimensional edge-preserving filter.

Favourably, said post-processing operation comprises a two-dimensional median filter. Favourably, said combination-logic device is operable to invert signal M1 to signal C. Favourably, said combination-logic device is operable to combine the signals A, B and C together to the final motion map.

Favourably, said input data comprises an edge map, said edge map identifying the edges of an image, whereby said processing-segmentation device comprises a pre-processing device operable to receive and process the motion map and to output a pre-processed motion map; and a segmentation device operable to receive and process the pre-processed motion map and the edge map and to output the signals M1, M2 and M3.

Favourably, said accurate motion map generating apparatus further comprises an image analysing device operable to receive and process image data and to output said input data comprising the motion map.

Favourably, said image analysing device comprises a motion detection device operable to receive and process said image data and to output said motion map; and an edge detection device operable to receive and process said image data and to output said edge map; said image analysing device being operable to output said input data comprising said motion map and said edge map.

Favourably, said motion detection device is operable to process based on accurate motion detection with hierarchical block splitting.

Favourably, said edge detection device is operable to process based on a 3×3 Sobel operator.

These objectives can also be solved by an accurate motion map generating method for receiving and processing input data comprising a motion map and for outputting a final motion map, whereby said motion map identifies the non- and the movement of pixels between at least two successive images, comprising a processing-segmentation step for receiving and processing said input data and for outputting a first signal M1, a second signal M2 and a third signal M3, whereby said signals M1, M2 and M3 are feature maps, respectively, which base on said input data and describe characteristics between the at least two successive images, said first signal M1 describing static edges, said second signal M2 describing moving edges, and said third signal M3 describing moving flat areas; and a combination-logic step for receiving and processing said first signal M1, said second signal M2 and said third signal M3 and for outputting said final motion map, whereby said final motion map is based on said signals M1, M2 and M3. Favourably, during the combination-logic step signal M2 is processed to signal A based on a morphological closing operation Closing A.

Favourably, the operation Closing A comprises a morphological dilatation operation followed by a morphological erosion operation.

Favourably, during the combination-logic step the signal M3 is processed to signal B based on a morphological closing operation Closing B followed by a post-processing operation.

Favourably, the operation Closing B comprises a morphological dilatation operation followed by a morphological erosion operation.

Favourably, said post-processing operation comprises a two-dimensional edge-preserving filter.

Favourably, said post-processing operation comprises a two-dimensional median filter. Favourably, during said combination-logic step the signal M1 is inverted to signal C. Favourably, during said combination-logic step the signals A, B and C are combined together to the final motion map.

Favourably, said input data comprises an edge map, said edge map identifying the edges of an image, whereby said processing-segmentation step comprises a pre-processing step for receiving and processing the motion map and for outputting a pre-processed motion map; and a segmentation step for receiving and processing the pre-processed motion map and the edge map and for outputting the signals M1, M2 and M3.

Favourably, said accurate motion map generating method further comprises an image analysing step for receiving and processing image data and for outputting said input data comprising the motion map.

Favourably, said image analysing step comprises a motion detection step for receiving and processing said image data and for outputting said motion map; and an edge detection step for receiving and processing said image data and for outputting said edge map; said image analysing step for outputting said input data comprising said motion map and said edge map.

Favourably, said motion detection step processes based on accurate motion detection with hierarchical block splitting.

Favourably, said edge detection step processes based on a 3×3 Sobel operator.

BRIEF DESCRIPTION OF THE DRAWINGS

The above and other objects, features and advantages of the present invention will become more apparent from the following detailed description when taken in conjunction with the accompanying drawings, in which:

FIG. 1 shows an example of an Accurate Motion Detection Footprint of state of the art, FIG. 2 shows a block diagram of a motion detection system comprising an embodiment of the present invention, FIG. 3 shows an example of a 5×5 Dilation Mask, FIG. 4 shows an example of a 3×3 Dilation or Erosion Mask or 5 Tap median cross, FIG. 5 shows an example of a motion segmentation system, FIG. 6 shows an example of a AMD-HBS system.

DETAILED DESCRIPTION OF EMBODIMENT

Figure 7:
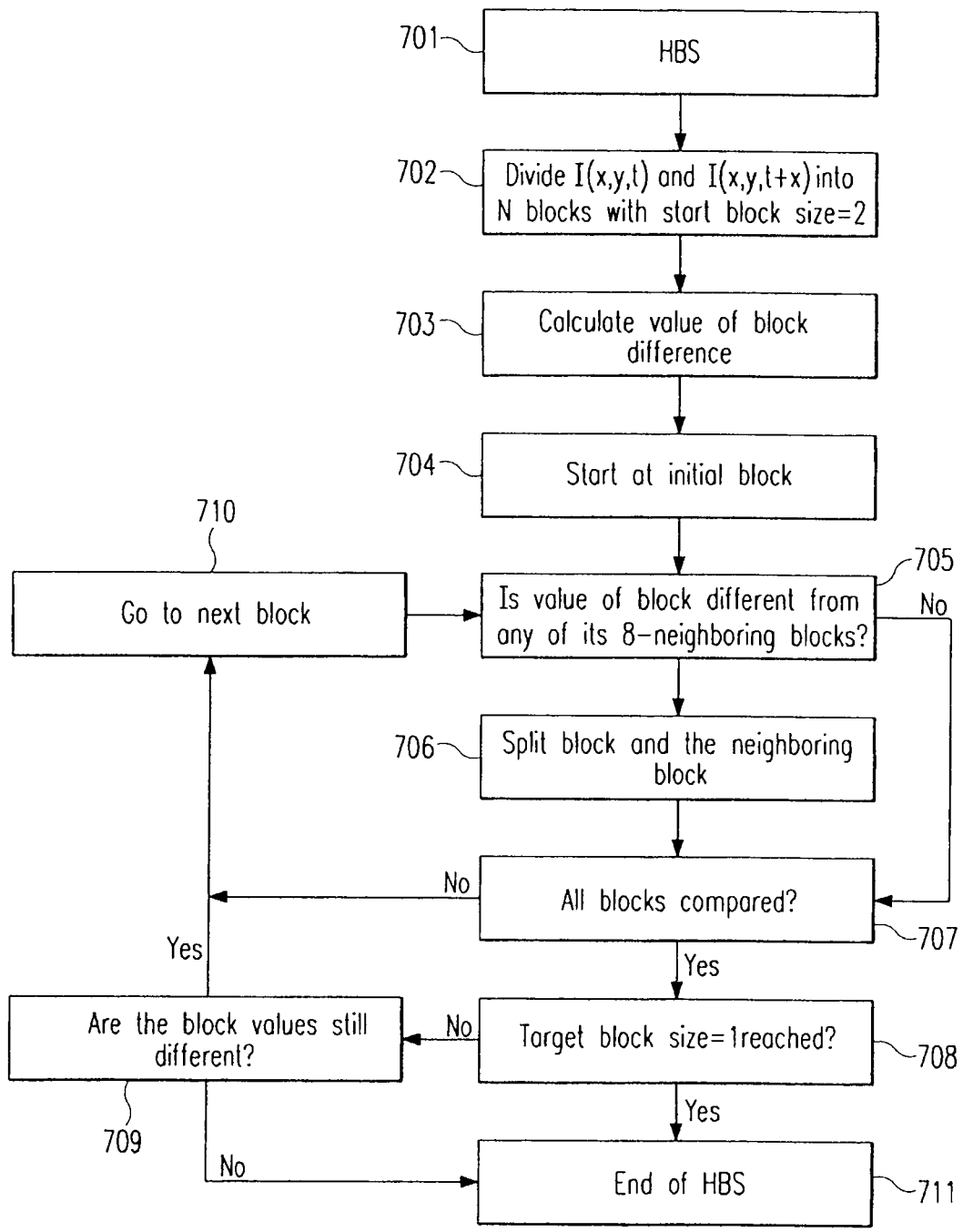
FIG. 7 shows an example of a flow diagram of the hierarchical block splitting process.

Motion detection shall provide information whether a certain local region in a sequence of consecutive images is stationary, thus consists of no motion, or is in motion. The output of a motion detection system is typically a binary motion map, which describes the state of a certain local region like e.g. pixel level or block level. The motion map value for said pixel or block is usually 0 for the stationary case and 1 in case that motion exists for a particular pixel.

A motion vector map may contain values above 1 like e.g. all integer values from 0 to 10, so that the speeds of the different pixels and/or objects can be differentiated. A motion vector map refers to the speed of motion, while a motion map rather refers to the existence of motion. Regarding a motion vector map, two different maps for x and y direction would be needed to differentiate horizontal and vertical motion if only one value is allowed in the motion vector map.

It should be noted that the expression "field" refers to an interlaced representation of an image, which can be an odd or even field. The term "frame" is used only if progressive material like e.g. a movie is referenced.

Following sections describe examples of motion detection models with different complexity levels, which can be used for motion detection between at least two successive images:

In the 'One field memory based motion detection', let $I(x,y,t)$ denote the actual field and $I(x,y,t-1)$ the previous field with an opposite scan raster. The index x addresses the columns of the respective field, while the index y marks the lines in an analogous manner. The index t describes the time instance of the video fields. Therefore a field difference d1 with the following equation is defined:

$$d_1(x,y,t) = |I(x,y,t) - I(x,y,t-1)| \tag{1}$$

Based on the absolute difference resulting from equation (1) a motion decision is made according to the following relation:

$$mm_1(x, y, t) = \begin{cases} 0 & \text{if } d_1(x, y, t) < T \\ 1 & \text{else} \end{cases} \tag{2}$$

The result of equation (2) can be interpreted as a motion map with the same resolution as the actual field. The pixel value of the respective motion map is 0 in case no motion is detected, thus stationary content, and 1 in case motion is apparent. In this technique the pixel difference information between two successive fields contains a spatial offset. This means, that the pixel information in the actual field is not available in the previous field due to interlace scanning. Thus the missing information has to be interpolated, which can easily be achieved by taking the linear average. The 'One field memory based motion detection' wrongly detects motion in stationary patterns, if they contain high vertical frequencies. Another possibility would be to interpolate both pictures to a common, virtual raster.

In the 'Two field memory based motion detection', the absolute pixel difference d2 is calculated over two fields with the same raster, meaning same parity motion detection. This difference has no spatial offset, since the two fields comprise the same lines in view of interlace scanning:

$$d_2(x,y,t) = |I(x,y,t-1) - I(x,y,t+1)| \tag{3}$$

Based on the absolute difference resulting from equation (2) a motion decision is made according to the following relation:

$$mm_2(x, y, t) = \begin{cases} 0 & \text{if } d_2(x, y, t) < T \\ 1 & \text{else} \end{cases} \tag{4}$$

The absolute difference is calculated over two fields with a field delay 2t. The pixel information is now aligned and contains no spatial offset, therefore no interpolation is necessary as it was before. As the motion decision is still based on a single difference, the 'Two field memory based motion detection' system according to equation (3) is prone to error in case of noise.

In the 'Three field memory based motion detection', a three-field memory is incorporated. Therefore a set of two-field pixel differences d3 is evaluated according to the following equation:

$$d_3(x, y, t) = F \begin{bmatrix} |I(x, y-1, t) - I(x, y-1, t-2)| \\ |I(x, y, t+1) - I(x, y, t-1)| \\ |I(x, y+1, t) - I(x, y+1, t-2)| \end{bmatrix} \tag{5}$$

In a simple realization the logical function descriptor F is replaced by the maximum over the pixel differences. Thus the motion decision is based upon the maximum pixel difference over the right side functional in (5). The logic function F can more generally be thought of as junction of all possible logic relations in the set.

The motion decision is based on the left side of equation (5) and described as follows:

$$mm_3(x, y, t) = \begin{cases} 0 & \text{if } d_3(x, y, t) < T \\ 1 & \text{else} \end{cases} \tag{6}$$

The scope of pixel differences is extended and the resulting motion map is more robust against errors due to noise, in comparison with the previously described motion detection techniques.

A 'Three field memory type motion detection' is described, which uses a texture detection method. The texture detection is based on a pixel based variance measure. The result of the texture detection is linked with the motion map in order to select one of four different de-interlacing algorithms.

In the 'Four field memory based motion detection', a four field memory technique for motion detection is presented, which is able to improve the accuracy of motion detection and to reduce the number of motion detection errors. The motion decision is based on the evaluation of three motion activity maps. There are two kinds of motion detection errors:

Error A: Mistaking the moving regions as static regions. This leads to the so-called 'mouse-teeth' artifact and is defined as false positive.

Error B: Mistaking the static regions as moving regions. This false negative leads to the so called 'flicker artifact' in presence of high vertical detail.

The Accurate Motion Detection (AMD) algorithm is based on the examination of pixel data over 5 consecutive fields, invoking four field memories. The motion information is obtained by comparing pixel values of same parity fields as shown in FIG. 1. If pixel differences exceed a certain threshold value, the pixel in the respective reference field is assumed to be moving.

In the AMD approach, three initial motion activity maps are calculated using the absolute pixel differences defined as follows:

$$P = \left| \frac{T_n + B_n}{2} - \frac{T_{n-2} + B_{n-2}}{2} \right| \tag{7}$$

$$Q = \left| \frac{T_n + B_n}{2} - \frac{T_{n+2} + B_{n+2}}{2} \right| \tag{8}$$

$$R = |X_{n-1} - X_{n+1}| \tag{9}$$

where $$T_n = I(x, y-1, t), \quad (10)$$
$$T_{n+2} = I(x, y-1, t+2),$$
$$T_{n-2} = I(x, y-1, t-2),$$
$$B_n = I(x, y+1, t),$$
$$B_{n+2} = I(x, y+1, t+2),$$
$$B_{n-2} = I(x, y+1, t-2),$$
$$X_{n-1} = I(x, y, t-1),$$
$$X_{n+1} = I(x, y, t+1)$$

In FIG. 1 an accurate motion detection footprint 101 with the three axis x, y and t is shown, whereby the abscissa is the time axis t 102, the ordinate is the line axis y 103 and the third axis is the column axis x 104. The time axis denotes the time points t−2, t−1, t, t+1 and t+2. The line axis y denotes the lines y−1, y and y+1. Moreover, $T_n$ 108, $T_{n+2}$ 111, $T_{n-2}$ 105, $B_n$ 109, $B_{2+2}$ 112 and $B_{n-1}$ 106, which are shown in FIG. 1, are referencing a pixel position or block position in the image sequence I(x,y,t), respectively. In addition, the frame $X_{n-1}$ 107 and the frame $X_{n+1}$ 110 are shown in FIG. 1. So e.g. pixel position $T_{n-2}$ and $B_{n-2}$ are of the same time point, but are displaced in view of their lines y, while e.g. $B_{n-2}$ and $B_n$ are referenced to the same lines y, but are displaced in their time points.

Based on the evaluation of the absolute differences P, Q and R resulting from the equations (7), (8) and (9) a final motion map $mm_{AMD}$ is calculated in two steps according to the following relations:

$$M = \begin{cases} R & \text{if } P < T \text{ and } Q < T \\ \text{median}(P, Q, R) & \text{else} \end{cases} \quad (11)$$

and $$mm_{AMD} = \begin{cases} 0 & \text{if } M < T \\ 1 & \text{else} \end{cases} \quad (12)$$

The creation of the final motion map $mm_{AMD}$ is described as follows:

If the pixel difference in the field references t−2 and t+2 is below a certain threshold T, whereby the top and bottom lines are averaged, only R is evaluated. Thus the motion information is taken from the two direct neighbors (t−1 and t+1) of the interpolated pixel only. In comparison to prior 'Two-field memory motion detection', in case P and Q are less than T, the AMD algorithm reduces the occurrence of false positives. This is mainly due to the assumption that moving object dimensions are above pixel level. A second point is the extended search range, which removes the influence of noise as 5 pixel pairs are taken into consideration.

In all other cases the 3-tap median of (P, Q, R) is used to determine the motion map. If only one of P or Q is greater than T, the median value depends on the motion activity map R. If R is less or equal to T, then M is less than T, so no motion is assumed. If R is greater T, then M is greater T and motion is assumed. Thus false negatives can be better reduced in comparison with common 5-field motion detection.

The AMD system is superior to the above described 2-field and 3-field memory based motion detection systems in terms of noise robustness and number of resulting false positives and false negatives.

Nevertheless the resulting motion maps of the described AMD realization can be improved in its accuracy in the vicinity of object borders and could consist holes inside moving or stationary objects. In this scope a hole is defined as a falsely assigned area having opposite value compared to the correctly assigned surrounding.

In the present invention the motion detection system can be extended with a hierarchical block splitting functionality, whereby the motion detection system is based on the AMD system and the extension thereof is referenced as Accurate Motion Detection-Hierarchical Block Splitting (AMD-HBS) system. The basic idea behind this extension is the concept of coarse-to-fine refinement, which provides an accurate motion map at moving object borders and a homogeneous motion map within objects.

Furthermore a post-processing can be applied to the motion detection system. In an example the motion detection is represented by the AMD-HBS system as shown by FIG. 6 by device 625. One proposed post-processing reduces remaining pixel errors and overlapping areas of stationary and moving areas in the motion map. Therefore it provides a segmentation of the motion map in three different feature maps which describe moving edges, moving flat areas and static edges between the at least two successive images. This segmentation is accomplished by either e.g. logic junctions of the motion map with a binary edge map or based on the motion map alone. The result of the segmentation is used to refine the motion detection results by reducing false positives and false negatives at edges or at the boundary of objects.

In more detail the feature map 'Moving Edge' describes all moving edges in a sequence of at least two images. The feature map 'Moving Flat Area' describes all moving areas in the sequence. These areas are normally regions within the moving object, that has constant color and/or brightness; eventually the movement of these comparably large areas can be described by one motion vector or less compared to the number of motion vectors for moving edges. The feature map 'Static Edge' describes all not moving edges in a sequence of the at least two images.

There are three different motion segmentation methods available:

Background Subtraction:
The pixels of the observed frame are compared with the pixels of a calculated background scene, respectively. The differences are mapped and compared to a threshold. In a scene with no background movement good results are achieved.

Motion Detection based methods:
Consecutive images are compared with each other. Similar to the background subtraction the differences are mapped and compared to a threshold. In scenes with a lot of movement good results are achieved, whereby holes are created in slowly changing areas in objects. Moreover no reference model is required and thus computational effort is reduced.

Motion Estimation based methods:
Motion vectors are calculated between two successive images. Vectors having the similar direction and value are summarized in a group called cluster. One big advantage is that moving objects can be recognized during camera movement. On the other hand real time calculation is very difficult due to the high computational effort.

After the comparison and evaluation of two successive frames a threshold can be applied to assign a binary value to the pixels, respectively. In another example, different thresholds or value ranges can be applied to assign not necessarily binary values but less numbers based on said difference values, respectively. Another example for a threshold is a Size-threshold, which omits small display portions, since the portions are most of the time not important; thus in case only large moving objects have to be tracked, detected or processed in some way, smaller moving objects can be omitted from the results of the motion detection.

FIG. 2 depicts an overview of an example of a motion detection system:

In FIG. 2 an example of a motion detection system 211 is shown which is operable to receive and process image input data 201 and output final motion map data 205. The motion detection system 211 comprises a motion detection device 206, a refinement device 208 and a edge detection device 207. The refinement device 208 comprises a pre-processing device 209 and a motion segmentation device 210.

The motion detection device 206 is operable to receive and process the image input data 201 to motion map data 202 and to output said motion map data 202. During the process the motion detection device 206 detects, where the image input data 201 identifies or describes motion or movement between at least two successive images and indicates the moving pixels or blocks by the generated motion map 202.

The edge detection device 207 is operable to receive and process said image input data 201 to edge map data 203 and to output said edge map data 203. During the process the edge detection device 207 detects where the image input data 201 identifies or describes edges and indicates the edge pixels by the generated edge map 203.

The refinement device 208 is operable to receive and process input data comprising motion map data 202 and edge map data 203 and to output said final motion map data 205.

The pre-processing device 209 is operable to receive and process motion map data 202 and to output pre-processed motion map data 204.

The motion segmentation device 210 is operable to receive and process the pre-processed motion map data 204 and the edge map data 203 and to output said final motion map data 205.

Of course, the present invention is not restricted to the setup shown in FIG. 2, but can comprise additional modules and devices like e.g. amplifiers, filters or the like to modify and process the data.

A detailed description of the refinement system is given subsequently. At first, the Hierarchical Block-Splitting (HBS) approach is explained.

This approach combines Accurate Motion Detection with Hierarchical Block Splitting (AMD-HBS) to improve the resulting motion map $mm_{AMD}$ in terms of robustness against false detections. By this approach, holes in moving objects can be closed and false positives in static areas can be reduced. Furthermore the correctness of the motion map in the vicinity of the object border is improved. In the following the hierarchical block splitting is explained in detail.

A block based motion detection is done on the interlaced input fields similar to the pixel-based process as depicted in FIG. 1. Let the interlaced input be field I(x,y,t) with image resolution X×Y.

In the initial step the input field I is divided in $N_0=(X/B_{Start})\times(Y/B_{Start})$ blocks B of size $B_{Start}\times B_{Start}$. $N_0$ stands for the number of blocks the input field is divided in. The block differences are calculated starting with the initial block size, iteratively splitting the block size for marked blocks until the target block size is reached. The block difference is calculated comparable with the field difference described above, but only considers the respective block of two image inputs like I(x,y,t) and I(x,y,t−1) instead of two complete image inputs at once. Simulation results have shown that values having $B_{Start}=2$ and $B_{Target}=1$ provide optimal results. The mathematic terms for the block differences are given by $$P = \left| \frac{T_{n_{HBS}} + B_{n_{HBS}}}{2} - \frac{T_{n_{HBS}-2} + B_{n_{HBS}-2}}{2} \right| \quad (13)$$

$$Q = \left| \frac{T_{n_{HBS}} + B_{n_{HBS}}}{2} - \frac{T_{n_{HBS}+2} + B_{n_{HBS}+2}}{2} \right| \quad (14)$$

$$R = |X_{n_{HBS}-1} - X_{n_{HBS}+1}| \quad (15)$$

$$T_{n_{HBS}} = \sum_{\vec{x}} T_n(\vec{x}) \quad (16)$$

and $B_{n_{HBS}}, T_{n_{HBS}-2}, B_{n_{HBS}-2}, T_{n_{HBS}+2}, B_{n_{HBS}+2}, X_{n_{HBS}}, X_{n_{HBS}}$ likewise After this initial processing step, the splitting process is done. The splitting process divides the actual block in four or more sub-blocks with the half dimensions in vertical and horizontal direction. A block is split, if it has a different value from any of its neighboring blocks in the surrounding 8-neighbourhood. In case of splitting, not only the actual block is split but also the neighbor block which showed the different value. Of course, the sub-blocks can be of the same size or even the same dimensions. On the other hand the sub-blocks can be of complete different size or dimensions. Blocks can e.g. only be compared with those neighboring blocks, which have the same size, or dimension or experienced the equal number of splits. Blocks can also be split symmetrically or unsymmetrically in less, equal or more than 4 blocks.

In addition, the block to be split can also be compared to e.g. the 4 neighboring blocks touching the side of the block to be split. Or to the 2 neighboring blocks lying horizontal or vertical in a line with said block to be split.

During the comparison of the block to be split and the neighboring blocks of one frame with a succeeding frame, it is detected whether the blocks move between said frames or are stationary. The status of a block can be "movement" or "nonmovement".

In case the specific block is showing a different status than a neighboring block like e.g. the specific block is in movement and the neighboring block is in nonmovement and/or vice-versa, both said specific block and said neighboring block will be split and the resulting blocks will be compared to their respective neighboring blocks and necessarily split and so on. First of all the comparison is performed wherein it is detected whose status of the neighboring blocks is different to the said specific block. Afterwards all those neighboring blocks being different to said specific block are split as well as said specific block. This method increases the accuracy of motion maps and helps to better identify and detect the border between movement and nonmovement.

Figure 8:
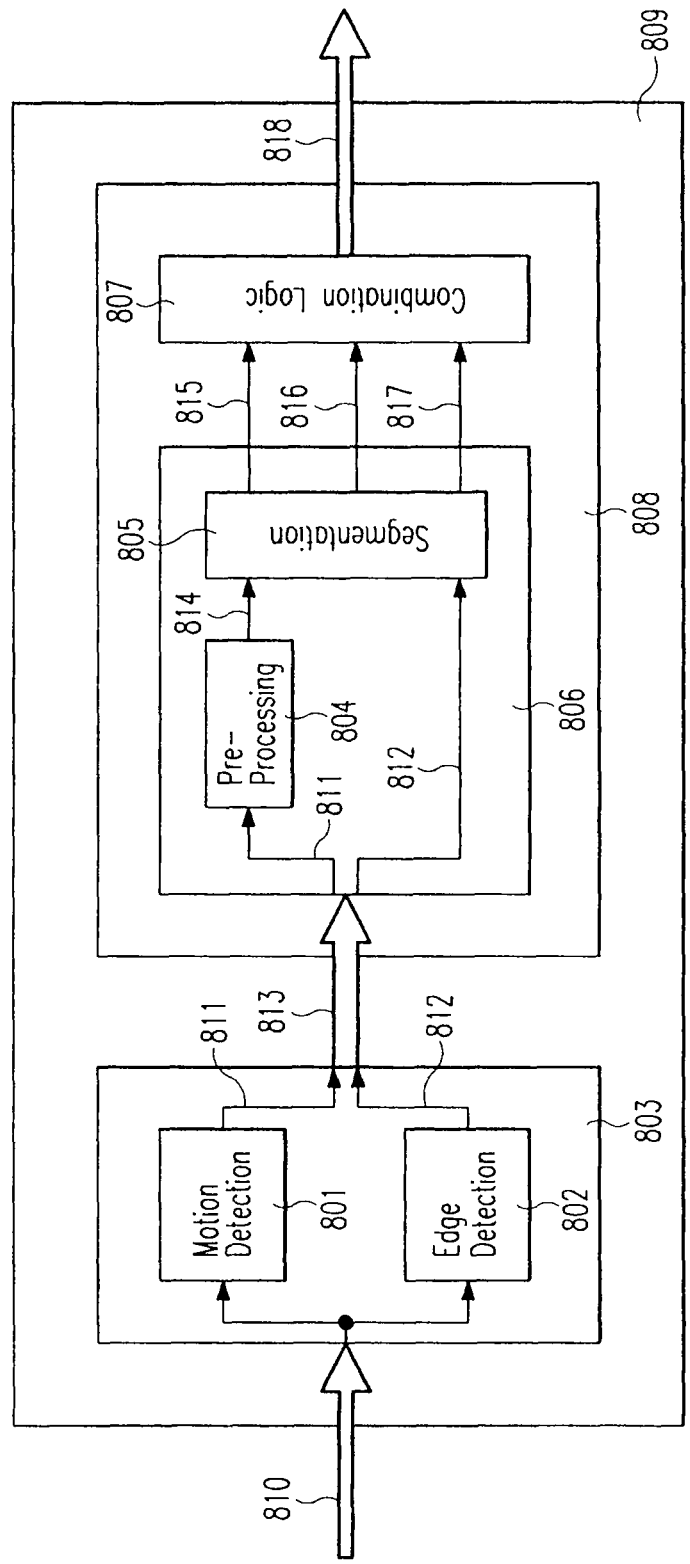
FIG. 8 shows an example of an accurate motion detection device.

The AMD-HBS can be performed by e.g. the devices 625, 206 and 801 shown in the FIGS. 6, 2 and 8, respectively.

With this coarse-to-fine approach, it is possible to accurately detect motion with respect to object borders and at the same time close holes inside the object. At a coarse scale the inner parts of semantic objects are assigned with coincident motion information. At finer scales the motion information of semantic objects near object borders is refined, if necessary.

FIG. 7 shows a flow diagram of a HBS routine comprising the steps 701 to 711.

Step 701 is the initial step of the flow diagram and indicates the start of the HBS routine. After step 701, the step 702 follows.

In step 702, two consecutive fields I are divided in N blocks, respectively, having the start block size 2. After step 702, step 703 follows.

In step 703, the respective blocks of the two consecutive fields are used to calculate the block difference. After step 703, step 704 follows.

In step 704, the process picks a first block with its respective block difference. After step 704, step 705 follows.

In step 705, the block difference is compared with its eight neighboring blocks, respectively, and it is decided whether the block difference value and the neighboring block difference value are different. If the values are different, meaning yes to the question, step 706 follows. If the values are not different, meaning no to the question, step 707 follows.

In step 706, the analyzed block and the compared neighboring block are split, unless the split target size 1 has already been reached.

In step 707, the process checks whether all blocks have been compared once. In another examples it checks whether all blocks have been compared a second, third, etc. time. If no, step 710 follows. If yes, step 708 follows.

In step 708, the process checks whether the block target size of I was reached for any of the blocks. If no, step 709 follows. If yes, step 711 follows.

In step 709, the process checks whether any of the blocks has block difference values which are different to the neighboring blocks and still can be split. If there are blocks left, meaning yes, step 710 follows. If no, step 711 follows.

In step 710, the next block is taken for the comparison step 705.

In step 711, the process of the HBS routine ends.

In another example of the process each block is split until the target size is reached or the block difference values of the neighboring blocks are similar or equal. Then the process goes to the next block.

In view of the FIG. 7 there are several exit conditions that will end the Hierarchical Block-Splitting routine:
- all blocks have been compared, the blocks still have different values in the end of the routine, the target block size is reached for the blocks having different values;
  - this can be considered as the case occurring most probably
- all blocks have been compared, the blocks do not have different values in the end of the routine, the target block size is reached;
  - this case is possible but rather seldom since the image would show a rather smooth gradient of the block values
- all blocks have been compared, the blocks do not have different values in the end of the routine, the target block size is not reached;
  - this case happens when e.g. the image has no distinct object or borderlines In another example of the present invention, the queries being responsible for the exit conditions can be summarized as following:

Eventually the HBS routine will continue until all blocks have been compared at least once and all blocks having different block difference values being split until reaching the target size or having no different block difference values between the neighboring blocks at all or anymore.

By meaning a block and a neighboring block having equal values of the block difference, it is considered that these values are not necessarily equal but remain in a specific tolerance or threshold, said threshold being automatically and/or manually adjustable by a user and/or the routine itself. Vice-versa a block and a neighboring block having different values of the block difference means that the values can exceed a specific tolerance or threshold, when compared to each other.

Simulation has shown stable results in terms of closing holes inside of objects, while a big initial block size, like e.g. 32×32 or 16×16, has lead to blocks overlapping or extending into the actual object. The block size that marks the end of the hierarchical splitting procedure should be set to pixel level having the dimension 1×1. When choosing a larger target block size, it is likely to mismatch the object shape in some cases. In one example the algorithm uses an initial block size of 2×2 and a target block size of 1×1.

The resulting motion map $mm_{AMD-HBS}$ is 1 for motion in the actual field and 0 for no motion.

$$M = \begin{cases} R & \text{if } P < T \text{ and } Q < T \\ \text{median}(P, Q, R) & \text{else} \end{cases} \quad (17)$$

and $$mm_{AMD-HBS} = \begin{cases} 0 & \text{if } M < T \\ 1 & \text{else} \end{cases} \quad (18)$$

In an example of the AMD-HBS system, the edge detection, which is e.g. represented by device 207 in FIG. 2, is used in combination with the motion information of the AMD-HBS system to derive a set of feature maps like moving edge, moving flat and/or static edge for the motion segmentation.

Generally the edge detection is not limited to a specific edge detection method. Any edge detection algorithm can be used, whereby the edge detector should deliver accurate edge information and be robust against noise.

In the example of the AMD-HBS system, the edge detection block comprises a 3×3 Sobel operator. The resulting edge map is 1, if an edge is present at the current pixel position and 0 else. The threshold parameter for edge detection is set to a small value resulting in a very sensitive edge detector, as it is important to detect as much edge information as possible because the segmentation is directly derived from the edge activity of a certain region. The Sobel operator has the drawback of at least 1 pixel overlap of the edge map and the original object shape, but the property of relatively thick edge lines in the feature map automatically connecting high detailed regions is a benefit.

The Sobel operator is an operator used in image processing, particularly within edge detection algorithms. Technically, it is a discrete differentiation operator, computing an approximation of the gradient of the image intensity function. At each point in the image, the result of the Sobel operator is either the corresponding gradient vector or the norm of this vector.

In simple terms, the operator calculates the gradient of the image intensity at each point, giving the direction of the largest possible increase from light to dark and the rate of change in that direction. The result therefore shows how "abruptly" or "smoothly" the image changes at that point, and therefore how likely it is that the part of the image represents an edge, as well as how that edge is likely to be oriented. In practice, the magnitude calculation, thus likelihood of an edge, is more reliable and easier to interpret than the direction calculation.

Mathematically, the gradient of a two-variable function, which is in this case the image intensity function, is at each image point a 2D vector with the components given by the derivates in the horizontal and vertical directions. At each image point, the gradient vector points in the direction of largest possible intensity increase, and the length of the gradient vector corresponds to the rate of change in that direction. This implies that the result of the Sobel operator at an image point, which is in a region of constant image intensity, is a zero vector and at a point on an edge is a vector which points across the edge, from darker to brighter values.

Since the intensity function of a digital image is only known at discrete points, derivatives of this function cannot be defined unless there is an assumable and underlying continuous intensity function, which has been sampled at the image points. With some additional assumptions, the derivative of the continuous intensity function can be computed as a function on the sampled intensity function, i.e. the digital image. It turns out that the derivatives at any particular point are functions of the intensity values at virtually all image points. However, approximations of these derivative functions can be defined at lesser or larger degrees of accuracy.

The Sobel operator represents a rather inaccurate approximation of the image gradient, but is still of sufficient quality to be of practical use in many applications. More precisely, it uses intensity values only in a 3×3 region around each image point to approximate the corresponding image gradient, and it uses only integer values for the coefficients, which weight the image intensities to produce the gradient approximation.

The refinement system 208 or 808 comprises a pre-processing module 209 or 804 and a motion segmentation module 210. The refinement system is operable to receive and process a motion map and an edge map and to output a final motion map. The motion map 202 or 811 can be provided by a motion detection module and the edge map 203 or 812 can be provided by an edge detection module. A functional overview of the refinement system is given in FIG. 2, 5, 6 or 8. The detailed description will follow in the next paragraphs.

The main task of the pre-processing is to reduce the remaining false positives and false negatives in the motion map and to further improve the homogeneity of the motion map. Therefore any edge-preserving spatio-temporal filter capable of reducing impulse noise can be used.

In an example, a two dimensional median filter can be chosen. A median filter is a rank order filter with the property to preserve edges while eliminating impulse noise. This means a median filter maintains the object shape while cancelling out false positives and false negatives.

In image processing it is usually necessary to perform high degree of noise reduction in an image before performing higher-level processing steps, such as edge detection. The median filter is a non-linear digital filtering technique, used to remove noise from images or other signals. The idea is to examine a sample of the input and decide if it is representative for the signal. This is performed using a window consisting of an odd number of samples. The values in the window are sorted into numerical order; the median value, the sample in the center of the window is selected as the output. The oldest sample is discarded, a new sample acquired, and the calculation repeats.

Median filtering is particularly useful in image processing to reduce speckle noise and salt and pepper noise. Its edge preserving nature makes it useful in cases where edge blurring is undesirable.

There are other non-linear filters, which can be used instead of said median filter like e.g. a minimum, or a maximum filter.

In an example of the AMD-HBS system, a two dimensional 5-tap median filter is applied to remove pixel structures with 1 or 2 pixel elongations from the motion map and to smooth objects while preserving object shape and edges. The current implementation uses 3 iterative convolutions with the median mask 402 depicted in FIG. 4 or as a pre-processing filter 209 in FIG. 2, 626 in FIG. 6 or 804 in FIG. 8.

A functional overview of the motion segmentation system is depicted in FIG. 5.

As described above, the resulting motion map $mm_{AMD-HIS}$ is more accurate and more homogeneous, but there is still a probability that fine static details like e.g. opaque overlay are falsely detected as motion. This leads to 'flicker artifacts' within the specific area.

A second problem occurs, if the motion map in the proximity of fine static details is extended into the moving object like e.g. background. This phenomenon leads to a so called 'halo-effect' around any detailed object, which in the worst case contains many 'mouse teeth' artifacts. The same artifacts are of course visible if there is fine detail moving in front of static background.

Intermediate results show that the iterative filtering with the described 5-tap median provides good results in terms of noise reduction and object smoothing inside its shape. Alternatively there were several types of morphological closing and opening operators tested, which used different structure elements for erosion and dilatation.

In image processing, the closing of a 2-dimensional set (image) A by another set B is the erosion of the dilation of that set, $$C(A,B)=(A+B)-B$$

Here, the plus sign stands for the dilation operation and the minus sign for the erosion operation. One has $$A \subset C(A,B)$$

Closing, together with opening, can be used for morphological noise removal. Opening removes small objects, while closing removes small holes.

In case, when none of these morphological operators are sensitive enough for post filtering the motion map as such, since it could not remove all errors on pixel level and close holes inside objects at the same time while preserving object shape, a more sophisticated post-processing is designed and applied which incorporates the use of morphological operators on pre-segmented feature maps.

In the following, a solution to the problem described above is presented, which incorporates the use of image segmentation, whereby the image or the motion map of at least two images is segmented into feature maps comprising static edges, moving edges and/or moving flat areas.

The motion segmentation post-processing like e.g. the refinement system 208 or specifically by the segmentation device 210 for a motion detection system like e.g. 211 targets to improve the stability and accuracy of the motion map concerning moving or static objects. Furthermore it achieves an improvement on the homogeneity of the motion map.

In a general approach the input motion map like e.g. 202 is segmented to three distinctive feature maps. These feature maps represent the moving edge, moving flat area and static edge parts of the input motion map, respectively. The segmentation can be done using any segmentation technique capable of segmenting the motion map into the respective feature maps. In another example the segmentation can be achieved via a set of logic junctions of the motion map with an edge map provided by an edge detection system as described before. This means that the data 813 does not necessarily include said edge map data in every embodiment of the present invention. Only the motion map data 811 is required to be part of said data 813.

In an example the signal path "Moving Edge" 501 in FIG. 5 is processed according to a morphological closing operation named Closing A like in device 519. The closing operation consists of a morphological dilatation followed by a morphological erosion. The main idea behind this closing operation is to fill holes inside moving edges by the dilatation operation and to maintain the outer edge shape by the erosion operation. The main benefit of the post-processing is the capability to fill small holes while preserving edge shape.

In an example the signal path "Moving Flat Area" 502 is processed with a closing operation entitled, Closing B like in device 520 followed by a post-processing operation like in device 521. The closing operation should fill in holes inside moving objects and maintain the outer shape of objects. In a general embodiment the post-processing block consists of a two-dimensional edge-preserving filter, which is capable of reducing impulse noise. In a more specific embodiment the post-processing block is a two-dimensional median filter as described before.

In an example the signal path A and B are combined by a logic OR junction in e.g. device 518. The result of the logic OR junction is combined with signal path C in e.g. device 514, which represents the inverted feature map "Static Edge" 503. Thus the static edges are cut out of the motion map. The result of the motion segmentation is the final motion map.

FIG. 5 shows a motion segmentation device 210, which corresponds to the one shown in FIG. 2. The motion segmentation device 210 comprises four AND logic devices 511 to 514, three INV logic devices 515 to 517, a OR logic device 518, a closing A device 519, a closing B device 520 and a post processing device 521.

The AND logic device 511 is operable to receive and process the pre-processed motion map data 204 and the edge map data 203 and to output the moving edge data 501.

The AND logic device 512 is operable to receive and process the pre-processed motion map data 204 and the inverted edge map data 509 and to output the moving flat data 502.

The AND logic device 513 is operable to receive and process the edge map data 203 and the inverted motion map data 510 and to output the static edge data 503.

The AND logic device 514 is operable to receive and process the signal AB' 507 and the signal C 508 and to output the final motion map data 205.

All AND logic devices 511 to 514 are operable to combine the respective input data according to the logic or Boolean operation AND, respectively.

The INV logic device 515 is operable to receive and process the edge map data 203 and to output the inverted edge map data 509.

The INV logic device 516 is operable to receive and process the pre-processed motion map data 204 and to output the inverted motion map data 510.

The INV logic device 517 is operable to receive and process the static edge map data 503 and to output the signal C 508.

All INV logic devices 515 to 517 are operable to invert the respective input data according to the logic or Boolean operation Negation or also called Inversion, respectively.

The OR logic device 518 is operable to receive, process and combine the signal A 504 and the signal B' 506 according to the logic operation OR and to output the signal AB' 507.

The closing A device 519 is operable to receive and process the moving edge data 501 and to output the signal A 504.

The closing B device 520 is operable to receive and process the moving flat data 502 and to output the signal B 505.

The closing operation is performed by a dilatation and afterwards erosion as explained before.

The post-processing device 521 is operable to receive and process the signal B 505, which is favorably performed by a 5 Tap median filtering as shown in FIG. 6 by device 632, and to output signal B' 506.

It is emphasized that all output data, which are output by the respective devices as shown in FIGS. 2, 5, 6 and 8, are based on the respective input data, which have been received by said devices.

In an example of the AMD-HBS system in FIG. 6 the motion detection refinement system segments the motion map $mm_{AMD\text{-}HBS}$ into three different feature maps with the following properties:

The signal path Moving Edge depicts the feature map for moving fine details like e.g. text, texture. The moving detail feature map is generated by a logic junction of the binary edge map with the binary motion map $mm_{AMD\text{-}HBS}$ after the 3 times iterated 5-tap median block. This image feature map is expanded by a 3×3 dilatation with the mask shown in FIG. 4. The dilatation leads to a filling of small gaps inside of fine structures and an overlap of moving fine details in static areas. The following 3×3 erosion operation removes some parts of overlapping areas and reduces the outer shape of moving fine details to its original dimension. As a result of this two processing steps a feature map is derived, where holes and small gaps inside moving fine details are closed and the original object shape is preserved.

The signal path Moving Flat describes the processing steps for flat moving areas like e.g. big homogeneous objects or background. The "moving flat" image feature map is generated by a logic junction of the inverted binary edge map with the binary motion map $mm_{AMD\text{-}HBS}$ after the 3 times iterated 5 Tap median block. Similar to the processing in path Moving Edge dilatation is followed by an erosion step. The main difference lies within the bigger mask size for dilatation (see FIG. 6). The large mask in the expansion process can be used, because the underlying region is flat and should be marked as moving area as a whole. Moving flat objects in front of homogeneous static background can be expanded. The possibly resulting halo is less visible, than the artifact resulting from static background, which extends into the moving object. Thus holes inside the object are closed via 5×5 dilation and the former object shape is approximated via 3×3 erosion followed by a 5-tap median low-pass filtering. Of course, the size and the dimension of the dilation masks can vary.

The feature map resulting from signal path Static Edge consists of static fine details. The image feature map static detail is achieved by a logic junction of the binary edge map with the inverted binary motion map $mm_{AMD\text{-}HBS}$ after the 3 times iterated 5-tap median block. It is very important to maintain the fine static regions like e.g. text overlay throughout the whole motion detection process. Therefore the inverted result from the static detail path is linked via an AND relation with the OR relation of moving detail and moving flat. Thus the fine static details are cut out of the expanded motion maps resulting from the moving detail path and moving flat path. The final motion map is the output of one proposed AMD-HBS system.

FIG. 6 shows an example of an AMD-HBS system 633, which is a more detailed and extended block diagram compared to FIG. 5. The system 633 comprises four AND logic devices 617 to 620, three INV logic devices 621 to 623, a OR logic device 624, an accurate motion detection-hierarchical block splitting device 625, a three iteration 5-tap median filter 626, an edge detection device 627, a 3×3 dilatation operation device 628, a 3×3 erosion operation device 629, a 5×5 dilatation operation device 630, a 3×3 erosion operation device 631 and a 5-tap median filter 632.

The devices 628 and 629 are part of the closing A device 519 described in FIG. 5, whereby the combination of said devices 628 and 629 is operable according to device 519.

The devices 630 and 631 are part of the closing B device 520 described in FIG. 5, whereby the combination of said devices 630 and 631 is operable according to device 520.

The filter 632 corresponds to the post-processing device 521 described in FIG. 5. All the AND logic devices 511 to 514, INV logic devices 515 to 517 and the OR logic device 518 described in FIG. 5 correspond to the AND logic devices 617 to 620, INV logic devices 621 to 623 and the OR logic device 624, respectively.

The devices 206, 207 and 209 described in FIG. 2 correspond to the devices 625, 627 and 626, respectively.

FIG. 8 shows an accurate motion detection device 809 which can correspond to the motion detection system 211 and is operable to receive and process image input data comprising a sequence of at least two images and to output a final motion map data 818. Said device 809 comprises an image analyzing device 803 as well as an refinement device 808.

In the present invention the signals M1, M2 and M3 correspond to the signals 815, 816 and 817, respectively.

The image analyzing device comprises a motion detection device 801 and an edge detection device 802, said device 803 being operable to receive and process image input data 810 and to output data 813 comprising edge map data 812 and motion map data 811. The motion detection device 801 and the edge detection device 802 correspond to the devices 206 and 207 shown in FIG. 2, respectively.

The refinement device 808 comprises a pre-processing segmentation device 806 and a combination logic device 807.

The pre-processing segmentation device 806 is operable to receive and process said data 813 and to output the static edge data 815, the moving edge data 816 and the moving flat area data 817. The device 806 comprises a pre-processing device 804 and a segmentation device 805. The pre-processing device 804 is operable to receive and process the motion map data 811 and to output a pre-processed motion map data 814 and can correspond to the pre-processing device 209 described in FIG. 2.

The segmentation device 805 is operable to receive and process the pre-processed motion map data 814 and the edge map data 812 and to output the static edge data 815, the moving edge data 816 and the moving flat area data 817.

The combination logic device 807 is operable to receive and process the static edge data 815, the moving edge data 816 and the moving flat area data 817 and to output the final motion map data 818.

Eventually the devices 514, 517, 518, 519, 520 and 521 described in FIG. 5 can be part of the combination logic device 807. Also the devices 620, 623, 624, 628, 629, 630, 631 and 632 described in FIG. 6 can be part of the combination logic device 807. The devices 511, 512, 513, 515 and 516 described in FIG. 5 can be part of the segmentation device 805. The devices 617, 618, 619, 621 and 622 described in FIG. 6 can be part of the segmentation device 805.

The main advantageous differences between the invention and the state of the art.

One example of the proposed method provides homogenous motion maps inside objects, and also maintains high accurate motion maps at object borders. This is achieved by combining the AMD algorithm with a hierarchical block splitting functionality, which incorporates a coarse-to-fine refinement of the motion maps. The splitting criterion is based on the difference between adjacent blocks.

The principle is to reassign pixels of the motion map only in the vicinity of object borders with different state, which describes either motion or a stationary state. The computational complexity is not depending on image features, but on the amount and properties of moving objects.

One example of the proposed method provides motion maps, which deliver less false positives or false negatives in comparison to state of the art implementations. This is achieved by an adequate pre-processing in the refinement system to the motion map (see FIG. 2).

One example of the proposed method provides motion maps with a small number of remaining false positives and false negatives especially in the vicinity of object borders. This is achieved by applying a motion segmentation refinement to the motion map.

One example of the proposed method, is adjustable in its spatial accuracy due to Hierarchical composition of motion detection process, but also in its refinement accuracy (splitting on e.g. pixel or sub-pixel-basis). The hierarchical block splitting method as well as the motion segmentation post-processing is not limited to the described motion detection process only and suitable for software implementation.

Advantages of one example of the proposed method can be seen in further video processing steps, like de-interlacing and motion estimation. Interpolation artifacts are reduced by the higher homogeneity, spatial accuracy and the fewer total number of false positives and false negatives.

The above description is only the preferred embodiment of the present invention while the protection scope thereof is not restricted by the description. Any variations and replacements within the technical range disclosed by this invention that easily occurs to persons skilled in the art should be under the coverage of the protection scope of this invention. Therefore, the protection scope of this invention should be as prescribed by the claims thereof.

| Reference List | |
|---|---|
| 101 | Accurate Motion Detection Footprint |
| 102 | time axis |
| 103 | y-axis |
| 104 | x-axis |
| 105 | pixel/block position $T_{n-2}$ |
| 106 | pixel/block position $B_{n-2}$ |
| 107 | frame $X_{n-1}$ |
| 108 | pixel/block position $T_n$ |
| 109 | pixel/block position $B_n$ |
| 110 | frame $X_{n+1}$ |
| 111 | pixel/block position $T_{n+2}$ |
| 112 | pixel/block position $B_{n+2}$ |
| 201 | image input data |
| 202 | motion map data |
| 203 | edge map data |
| 204 | pre-processed motion map data |
| 205 | final motion map data |
| 206 | motion detection device |
| 207 | edge detection device |
| 208 | refinement device |
| 209 | pre-processing device |
| 210 | motion segmentation device |
| 211 | motion detection system |
| 301 | 5 × 5 Dilation Mask |
| 401 | 3 × 3 Dilation/Erosion Mask |
| 402 | 5-Tap Median Cross |
| 501 | moving edge |
| 502 | moving flat |
| 503 | static edge |
| 504 | signal A |
| 505 | signal B |
| 506 | signal B' |
| 507 | signal AB' |
| 508 | signal C |
| 509 | inverted edge map |
| 510 | inverted motion map |
| 511-514 | AND logic |
| 515-517 | INV logic |
| 518 | OR logic |

-continued

| Reference List | |
|---|---|
| 519 | Closing A |
| 520 | Closing B |
| 521 | post-processing |
| 601 | motion map |
| 602 | edge map |
| 603 | pre-processed motion map |
| 604 | inverted edge map |
| 605 | inverted motion map |
| 606 | moving detail |
| 607 | moving flat |
| 608 | static detail |
| 609 | signal A1 |
| 610 | signal A2 |
| 611 | signal B1 |
| 612 | signal B2 |
| 613 | signal B2' |
| 614 | signal D |
| 615 | signal C |
| 616 | final motion map |
| 617-620 | AND logic |
| 621-623 | INV logic |
| 624 | OR logic |
| 625 | Accurate Motion Detection-Hierarchical Block Splitting (AMD-HBS) |
| 626 | 3 iter, 5-tap median |
| 627 | edge detection |
| 628 | 3 × 3 Dilatation |
| 629 | 3 × 3 Erosion |
| 630 | 5 × 5 Dilatation |
| 631 | 3 × 3 Erosion |
| 632 | 5-tap median |
| 633 | AMD-HBS system |
| 701 | start of Hierarchical Block Splitting routine |
| 702 | division block - step |
| 703 | block difference calculation - step |
| 704 | start with initial block - step |
| 705 | comparison - query |
| 706 | splitting - step |
| 707 | all block comparison - query |
| 708 | target block size - query |
| 709 | block difference - query |
| 710 | go to next block - step |
| 711 | end of Hierarchical Block Splitting routine |
| 801 | motion detection device |
| 802 | edge detection device |
| 803 | image analysing device |
| 804 | pre-processing device |
| 805 | segmentation device |
| 806 | processing-segmentation device |
| 807 | combination logic device |
| 808 | refinement device |
| 809 | accurate motion detection device |
| 810 | image input data |
| 811 | motion map data |
| 812 | edge map data |
| 813 | data comprising edge map data and motion map data |
| 814 | pre-processed motion map data |
| 815 | static edge data M1 |
| 816 | moving edge data M2 |
| 817 | moving flat area data M3 |
| 818 | final motion map data |

The invention claimed is:

1. An accurate motion map generating apparatus operable to receive and process input data comprising a motion map and to output a final motion map,
wherein said motion map identifies the non-movement and the movement of pixels between at least two successive images, comprising
a processing-segmentation device operable to receive and process said input data and output a first signal M1, a second signal M2 and a third signal M3,
wherein said signals M1, M2 and M3 are feature maps, respectively, which base on said input data and describe characteristics between the at least two successive images,
said first signal M1 describing static edges,
said second signal M2 describing moving edges, and
said third signal M3 describing moving flat areas; and
a combination-logic device operable to receive and process said first signal M1, said second signal M2 and said third signal M3 and to output said final motion map,
wherein said final motion map is based on said signals M1, M2 and M3.

2. An accurate motion map generating apparatus according to claim 1, wherein combination-logic device is operable to process signal M2 to signal A based on a morphological closing operation Closing A.

3. An accurate motion map generating apparatus according to claim 2,
wherein the operation Closing A comprises a morphological dilatation operation followed by a morphological erosion operation.

4. An accurate motion map generating apparatus according to one of the above-mentioned claims,
wherein the combination-logic device is operable to process signal M3 to signal B based on a morphological closing operation Closing B followed by a post-processing operation.

5. An accurate motion map generating apparatus according to claim 4,
wherein the operation Closing B comprises a morphological dilatation operation followed by a morphological erosion operation.

6. An accurate motion map generating apparatus according to claim 4,
wherein said post-processing operation comprises a two-dimensional edge-preserving filter.

7. An accurate motion map generating apparatus according to claim 6,
wherein said post-processing operation comprises a two-dimensional median filter.

8. An accurate motion map generating apparatus according to claim 1,
wherein said combination-logic device is operable to invert signal M1 to signal C.

9. An accurate motion map generating apparatus according to claim 2,
wherein the combination-logic device is operable to process signal M3 to signal B based on a morphological closing operation Closing B followed by a post-processing operation, wherein said combination-logic device is operable to invert signal M1 to signal C, and
wherein said combination-logic device is operable to combine the signals A, B and C together to the final motion map.

10. An accurate motion map generating apparatus according to one of the above-mentioned claim 1,
wherein said input data comprises an edge map, said edge map identifying the edges of an image,
wherein said processing-segmentation device comprises a pre-processing device operable to receive and process the motion map and to output a pre-processed motion map; and
a segmentation device operable to receive and process the pre-processed motion map and the edge map and to output the signals M1, M2 and M3.

11. An accurate motion map generating apparatus according to claim 1, further comprising
an image analysing device operable to receive and process image data and to output said input data comprising the motion map.

12. An accurate motion map generating apparatus according to claim 10,
further comprising an image analysing device operable to receive and process image data and to output said input data comprising the motion map,
wherein said image analysing device comprises
a motion detection device operable to receive and process said image data and to output said motion map; and
an edge detection device operable to receive and process said image data and to output said edge map;
said image analysing device being operable to output said input data comprising said motion map and said edge map.

13. An accurate motion map generating apparatus according to claim 12,
wherein said motion detection device is operable to process based on accurate motion detection with hierarchical block splitting.

14. An accurate motion map generating apparatus according to claim 12,
wherein said edge detection device is operable to process based on a 3×3 Sobel operator.

15. An accurate motion map generating method for receiving and processing input data comprising a motion map and for outputting a final motion map,
wherein said motion map identifies the non-movement and the movement of pixels between at least two successive images, comprising
a processing-segmentation step for receiving and processing said input data and for outputting a first signal M1, a second signal M2 and a third signal M3,
wherein said signals M1, M2 and M3 are feature maps, respectively, which base on said input data and describe characteristics between the at least two successive images,
said first signal M1 describing static edges,
said second signal M2 describing moving edges, and
said third signal M3 describing moving flat areas; and
a combination-logic step for receiving and processing said first signal M1, said second signal M2 and said third signal M3 and for outputting said final motion map, wherein said final motion map is based on said signals M1, M2 and M3.

16. An accurate motion map generating method according to claim 15,
wherein during the combination-logic step signal M2 is processed to signal A based on a morphological closing operation Closing A.

17. An accurate motion map generating method according to claim 16,
wherein the operation Closing A comprises a morphological dilatation operation followed by a morphological erosion operation.

18. An accurate motion map generating method according to claim 15,
wherein during the combination-logic step the signal M3 is processed to signal B based on a morphological closing operation Closing B followed by a post-processing operation.

19. An accurate motion map generating method according to claim 18,
wherein the operation Closing B comprises a morphological dilatation operation followed by a morphological erosion operation.

20. An accurate motion map generating method according to claim 18,
wherein said post-processing operation comprises a two-dimensional edge-preserving filter.

21. An accurate motion map generating method according to claim 20,
wherein said post-processing operation comprises a two-dimensional median filter.

22. An accurate motion map generating method according to claim 15,
wherein during said combination-logic step the signal M1 is inverted to signal C.

23. An accurate motion map generating method according to claim 16,
wherein during the combination-logic step the signal M3 is processed to signal B based on a morphological closing operation Closing B followed by a post-processing operation,
wherein during said combination-logic step the signal M1 is inverted to signal C, and
wherein during said combination-logic step the signals A, B and C are combined together to the final motion map.

24. An accurate motion map generating method according to claim 15,
wherein said input data comprises an edge map, said edge map identifying the edges of an image,
wherein said processing-segmentation step comprises
a pre-processing step for receiving and processing the motion map and for outputting a pre-processed motion map; and
a segmentation step for receiving and processing the pre-processed motion map and the edge map and for outputting the signals M1, M2 and M3.

25. An accurate motion map generating method according to claim 15, further comprising
an image analysing step for receiving and processing image data and for outputting said input data comprising the motion map.

26. An accurate motion map generating method according to claim 24,
further comprising an image analysing step for receiving and processing image data and for outputting said input data comprising the motion map,
wherein said image analysing step comprises
a motion detection step for receiving and processing said image data and for outputting said motion map; and
an edge detection step for receiving and processing said image data and for outputting said edge map;
said image analysing step for outputting said input data comprising said motion map and said edge map.

27. An accurate motion map generating method according to claim 26,
wherein said motion detection step processes based on accurate motion detection with hierarchical block splitting.

28. An accurate motion map generating method according to claim 26,
wherein said edge detection step processes based on a 3×3 Sobel operator.

* * * * *